United States Patent Office 3,142,534
Patented July 28, 1964

3,142,534
MANUFACTURE OF DEFLUORINATED
PHOSPHATES
John D. Nickerson, Lakeland, Fla., assignor to International Minerals & Chemical Corporation, a corporation of New York
No Drawing. Filed Oct. 25, 1960, Ser. No. 64,744
11 Claims. (Cl. 23—108)

The present invention generally relates to the manufacture of defluorinated phosphates. More particularly it relates to a process for defluorinating acid treated phosphate rock to produce a defluorinated phosphate useful as animal feed or animal feed supplement, although the defluorinated phosphate may also be used as a fertilizer or plant food.

Superphosphate is a term generally applied to the product obtained by treating finely ground phosphate rock with sulfuric acid. Phosphate rock is predominantly tricalcium phosphate and when it is treated with sulfuric acid the tricalcium phosphate is converted into a mixture of calcium sulfate and hydrated monocalcium orthophosphate.

Triple superphosphate is a concentrated phosphate manufactured in a process similar to that used for preparing ordinary superphosphate except that phosphoric acid is utilized in place of sulfuric acid. In the manufacture of triple superphosphate finely ground phosphate rock is mixed with phosphoric acid in predetermined proportions. The resultant mass is permitted to set up and is cured in large storage piles. The main phosphate ingredient in triple superphosphate is hydrated monocalcium orthophosphate.

The mineral phosphates of all of the commercially exploited natural deposits in the United States and in most foreign countries contain fluorine which may be present in an amount as high as 3.8% by weight or higher, and is generally about 3.3%. When these mineral phosphates are used to manufacture superphosphate and/or triple superphosphate, the fluorine carries over into the phosphatic product. Because of the presence of significant proportions of fluorine in superphosphate and triple superphosphate, these phosphatic materials are not generally suitable for use as animal feeds since serious detrimental effects are caused by the continued feeding of significant amounts of fluorine to animals, particularly cattle. It is, therefore, generally necessary to reduce the fluorine content of phosphate rock and of phosphatic materials made from phosphate rock before the phosphatic material is suitable for use as an animal feed. In feed grade phosphates the weight ratio of phosphorous to fluorine, P/F, is preferably greater than 50, and still more preferably greater than about 100.

The availability of the phosphate is also an important factor to consider when the phosphate is used as an animal feed. By availability as used herein is meant that the phosphate is in the orthophosphate form or an equivalent state such as is found in beta-tricalcium phosphate, in which state the phosphate can best be assimilated by the animal. For animal feed, the phosphate is preferably substantially 100% in the ortho form, as determined by solubility in 0.4% HCl. Moreover, chick feeding tests have shown that preferably 80% or more of the phosphate should be soluble in neutral ammonium citrate.

Accordingly, it is an object of the present invention to provide a process for manufacturing a phosphate product of low fluorine content.

It is another object of the present invention to provide an animal feed ingredient meeting the industry's requirement for a product having a P/F weight ratio greater than 50.

A specific object of the present invention is to provide a process for manufacturing an animal feed ingredient from superphosphate.

Another specific object of the invention is to provide a process for manufacturing an animal feed ingredient from triple superphosphate.

These and other objects and advantages of the present invention will be apparent as the description of the present invention progresses.

In accordance with the present invention, superphosphate, triple superphosphate or mixtures of these phosphates, containing fluorine is subjected to a heating treatment in the presence of steam at predetermined conditions. It has been determined that a defluorinated phosphate of high availability may be prepared from superphosphate or triple superphosphate when the phosphatic material is heated to a temperature within the range of from about 212° F. to about 446° F in an atmosphere containing a large amount of water vapor.

The process offers an economical and novel method of obtaining an improved animal feed supplement. The process in its preferred embodiment entails the intimate mixing of finely divided solid phosphatic material and steam. Other material may, of course, be included in the solids mixture as, for example, lime, limestone, soda ash, etc.

The fluorine-containing solid phosphatic material, which has a P/F weight ratio less than 50/1, generally less than 25/1, and more generally less than 10/1, is preferably in finely divided form, generally less than 1 mm. size. The fluorine-containing phosphatic material may be superphosphate, triple superphosphate, or mixtures thereof, and, of course, mixtures containing these phosphatic materials. These phosphatic materials generally contain at least 1% by weight of fluorine and the present invention is particularly directed to defluorinating such materials. The phosphatic material is best utilized when it is finely ground so that from about 40% to about 80% is capable of passing through a 100 mesh screen. Less finely divided material may, however, be used.

In accordance with the present invention, the phosphatic material is subjected to a heat treatment in the presence of steam to drive off the fluorine. The heat treatment may be effected in any suitable equipment such as a rotary kiln in which the phosphatic material is subjected to a tumbling action and in which the solids and steam can pass cocurrently, but preferably pass in countercurrent flow. The phosphatic material may also be defluorinated in equipment of the moving bed type. Fluid bed or fluidized bed systems may also be used.

In the process of this invention the phosphatic material is heated to a temperature above 212° F. and below 446° F. At temperatures below 212° F. effective defluorination is not achieved and at temperatures above 446° F. the availability of the phosphate in the product is significantly lower. A preferred temperature range is from about 300° F. to about 446° F. Effective defluorination and the production of a product of high availability have been achieved when operating at temperatures within these ranges.

The heating is conducted in an atmosphere of at least 50 volume percent steam, preferably at least 75 volume percent steam, and more preferably is conducted in an atmosphere of substantially pure steam. It has been determined that it is preferable to remove the evolved fluorine from contact with the phosphatic material during the defluorination and it is, accordingly, preferred that the steam be passed through the phosphatic material in the process of the present invention so as to sweep the evolved fluorine away from contact with the solid phosphatic material. Preferably at least 50 pounds of steam per minute per ton of phosphatic material is utilized and more preferably at least about 100 pounds of steam per minute per ton of phosphatic material and still more preferably at least 150 pounds of steam per minute per ton of phosphatic material is used. These are relatively high steam rates, however, it has been determined that effective defluorination of the phosphatic material and the production of a product having a high availability are achieved when such high steam rates are utilized. Defluorination of the phosphatic material during the heat treatment in the presence of steam is enhanced by the sweeping action of the steam passing over and through the phosphatic solids.

During the heat treatment, fluorine is driven off from the phosphatic material so as to render it acceptable as an animal feed ingredient. In general, the temperature of the heating operation and the period of time the phosphatic material is at the temperature are dependent variables with longer times being required at lower temperatures to achieve the same P/F. Or, conversely, at higher temperatures shorter periods of time are required to achieve the same P/F. The time period is usually more than 5 minutes and less than 6 hours and preferably more than 15 minutes and less than 4 hours; however, shorter or longer periods of time may be used. A period of time longer than necessary to achieve the desired P/F is, however, generally economically impractical.

After the heat treatment in the presence of steam in accordance with the present invention, it is preferable to cool the product in a steam atmosphere to a temperature below 300° F. before exposing the product to the atmosphere. Exposing the product to the air when at a temperature above 300° F. generally lowers the orthophosphate, water soluble $P_2O_5$ and citrate soluble $P_2O_5$ content of the product.

The citrate solubility of the product prepared in accordance with this invention is high. The high P/F ratio and the high citrate solubility make the product eminently suitable for use as an animal feed ingredient; the product may, however, also be used as plant food.

The process of the invention will be more fully understood from the following example which is given by way of illustration only and without any intention of the invention being limited thereto.

EXAMPLE

Triple superphosphate was defluorinated with steam in a series of two tests. In each test a 150 gram sample of triple superphosphate was placed in a vertical three inch tube furnace and treated with steam at 419° F. for two hours. Steam was continuously passed through the heated triple superphosphate sample. A different steam rate was used in each test. The steam rates and results of the tests are given below in the table. A control without the addition of steam was also run.

Table

| | Feed | Control | Steam defluorinated sample | |
|---|---|---|---|---|
| | | | A | B |
| Citrate soluble $P_2O_5$ (percent of total $P_2O_5$) | 96.4 | 96.0 | 94.5 | 95.3 |
| P/F | 8 | 15 | 54 | 105 |
| Steam rate in lbs. $H_2O$/minute/ton of triple superphosphate | 0 | 0 | 66 | 240 |

The above data clearly illustrates that effective defluorination is achieved when following the procedure of the present invention. It may be noted from the table that heating at 419° F. in the absence of steam effected only a small degree of defluorination. When a steam rate of about 50 pounds per minute per ton of triple superphosphate is used, a defluorinated material having a P/F of at least 50 may be achieved. To obtain a P/F of at least 100 a longer steaming time and/or a higher steam rate of at least about 150 pounds of steam per minute per ton of triple superphosphate is preferably used.

The tests illustrate that defluorination at relatively low temperatures may be achieved while still retaining a citrate soluble $P_2O_5$ level of over 90%.

In another test, another sample of the triple superphosphate used in the above tests was heated in the absence of steam to defluorinate the sample. A temperature of about 770° F. was necessary to achieve a P/F of about 50 in two hours. The citrate solubility of the defluorinated product, however, dropped to 75% citrate soluble $P_2O_5$ (percent of total $P_2O_5$). When following the procedure of the present invention more effective defluorination at lower temperatures and a product of much higher citrate solubility are obtained. The high P/F ratio and the high citrate solubility make the product eminently suitable for use as an animal feed ingredient; the product may, however, also be used as plant food.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for producing a phosphatic material of reduced fluorine content from a solid fluorine-containing acid treated phosphatic material having a P/F ratio less than 50/1 which comprises heating a solid fluorine-containing acid treated phosphatic material selected from the group consisting of superphosphate, triple superphosphate and mixtures thereof for at least five minutes at a temperature within the range of from about 212° F. to about 446° F. in the presence of an atmosphere of at least 50 volume percent steam and recovering a solid phosphatic material of reduced fluorine content having a P/F ratio greater than 50/1.

2. The process of claim 1 wherein said fluorine-containing acid treated phosphatic material comprises triple superphosphate.

3. The process of claim 1 wherein said fluorine-containing acid treated phosphatic material comprises superphosphate.

4. The process of claim 1 wherein the heating is effected at a temperature within the range of from about 300° F. to about 446° F.

5. A process for producing a phosphatic material having a P/F ratio greater than 50/1 from a solid fluorine-containing acid treated phosphatic material having a P/F ratio less than 50/1 which comprises heating a solid fluorine-containing acid treated phosphatic material having a particle size of less than 1 mm. selected from the group consisting of superphosphate, triple superphosphate and mixtures thereof at a temperature within the range of from about 212° F. to about 446° F. in the presence of an atmosphere of at least 50 volume percent steam for at least five minutes, said steam being provided at the rate of at least 50 pounds of steam per minute per ton of said phosphatic material, and recovering a solid phosphatic material of reduced fluorine content having a P/F ratio greater than 50/1.

6. The process of claim 5 wherein said fluorine-containing acid treated phosphatic material comprises triple superphosphate.

7. The process of claim 5 wherein said fluorine-containing acid treated phosphatic material comprises superphosphate.

8. The process of claim 5 wherein the heating is effected at a temperature within the range of from about 300° F. to about 446° F.

9. The process of claim 5 wherein said steam is provided at the rate of at least 100 pounds of steam per minute per ton of said phosphatic material.

10. The process of claim 5 wherein said steam is provided at the rate of at least 150 pounds of steam per minute per ton of said phosphatic material.

11. The process of claim 8 wherein the steamed product is lowered to a temperature below 300° F. in a steam atmosphere before exposing it to the air.

References Cited in the file of this patent
UNITED STATES PATENTS

| | | |
|---|---|---|
| 2,933,372 | Manning | Apr. 19, 1960 |
| 2,977,196 | Fleming | Mar. 28, 1961 |
| 2,995,436 | Hollingsworth et al. | Aug. 8, 1961 |
| 2,995,437 | Hollingsworth | Aug. 8, 1961 |